No. 666,571. Patented Jan. 22, 1901.
H. L. STILLMAN.
WHEEL FOR VEHICLES.
(Application filed June 22, 1900.)
(No Model.)

Witnesses.
H. E. Barlow
C. S. Marsh

Inventor.
Herbert L. Stillman

UNITED STATES PATENT OFFICE.

HERBERT L. STILLMAN, OF WESTERLY, RHODE ISLAND.

WHEEL FOR VEHICLES.

SPECIFICATION forming part of Letters Patent No. 666,571, dated January 22, 1901.

Application filed June 22, 1900. Serial No. 21,171. (No model.)

*To all whom it may concern:*

Be it known that I, HERBERT L. STILLMAN, a resident of the town of Westerly, in the county of Washington and State of Rhode Island, have invented certain new and useful Improvements in Wheels for Vehicles; and I do hereby declare that the following is a full, clear, and exact description thereof, reference being had to the accompanying drawings, and to the letters of reference marked thereon, which form a part of this specification.

This invention has relation to improvements in car-wheels, but is intended more particularly for the automobile coaches operated on light rails.

The invention will be fully understood from the following description when taken in connection with the accompanying drawings, in which—

Figure 1:
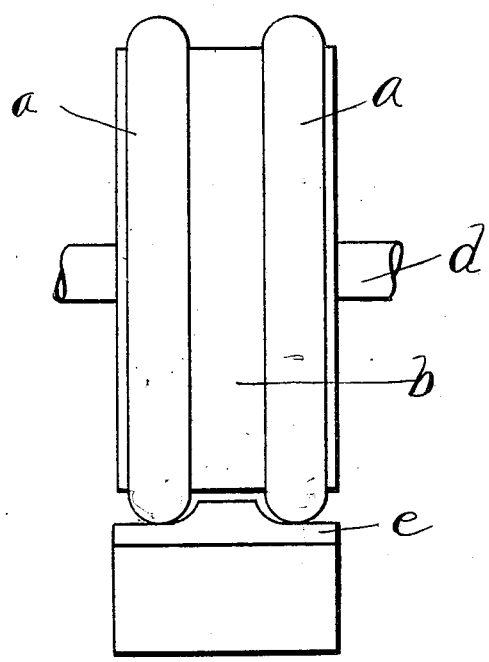
Figure 2:
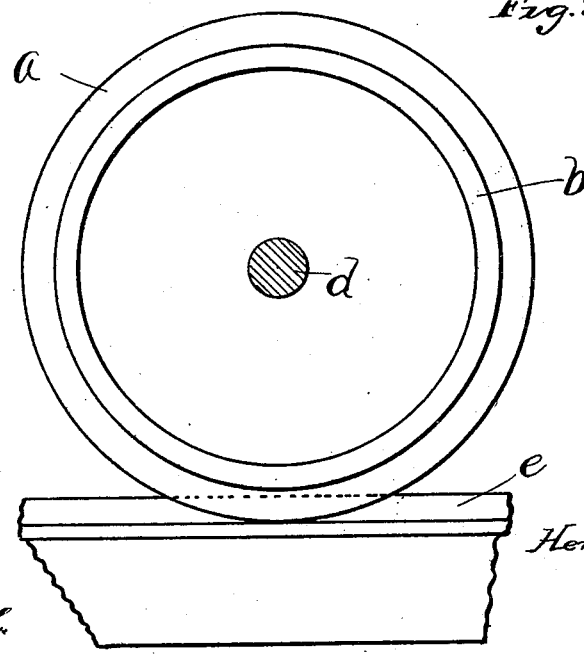

Figure 1 is a face view of a wheel with my improvements attached. Fig. 2 is a side elevation of same.

Referring by letter to said drawings, $a\ a$ show rubber tires, $b$ shows central steel tire, $c$ shows center bearing-rail, and $d$ shows axle of wheel.

In operation I place on the wheel a steel tire having a central steel tread with a channel on each side for the reception of the rubber tires. Said rubber tires are intended to run on the trams of the rail, and with light loads the rubber tires only come in contact with the rail. With heavier loads these flatten, so as to bring in contact the central steel tire on the head of the rail, limiting the weight on the rubber tires. It will thus be seen that the advantage of the rubber in adhesion to the tracks, preventing wear of the rails, and avoiding concussions are secured, and that heavy loads may be carried, and that these wheels may be run on ordinary highways, the concavity in the face of the wheel tending to prevent settling in soft roads.

Having thus described my improvements, I claim as my invention and desire to secure by Letters Patent—

A car or carriage wheel having a pair of parallel rubber tires separated by a central metal tread.

In testimony whereof I have hereunto set my hand this 20th day of June, 1900.

HERBERT L. STILLMAN.

In presence of—
   H. E. BARLOW,
   E. S. MARSH.